United States Patent
Janisch

3,646,667
Mar. 7, 1972

[54] IGNITION CIRCUIT

[72] Inventor: Douglas G. Janisch, Mequon, Wis.

[73] Assignee: Tecumseh Products Company, Tecumseh, Mich.

[22] Filed: June 18, 1970

[21] Appl. No.: 47,218

Related U.S. Application Data

[62] Division of Ser. No. 684,051, Nov. 17, 1967, Pat. No. 3,524,438.

[52] U.S. Cl. .................................29/593, 73/1, 123/148 E, 123/149 C, 315/214, 315/205, 315/223
[51] Int. Cl. ......................G01r 4/00, G05f 4/00, H01h 4/00
[58] Field of Search ....................29/592, 593; 73/1; 315/214, 315/205, 223; 123/148 E, 149 C

[56] References Cited

UNITED STATES PATENTS

| | | | |
|---|---|---|---|
| 3,250,992 | 5/1966 | Cronkite | 29/593 |
| 3,252,087 | 5/1966 | Parke | 29/593 |
| 3,526,835 | 9/1970 | Jones | 29/593 |
| 3,562,902 | 2/1971 | Green | 29/593 |
| 3,405,347 | 10/1968 | Swift | 123/148 |
| 3,395,684 | 8/1968 | Minks | 123/148 |
| 3,367,314 | 2/1968 | Hirosawa | 123/148 E |
| 3,358,665 | 12/1967 | Carmichael | 123/148 E |
| 3,349,284 | 10/1967 | Roberts | 123/148 |
| 3,240,198 | 3/1966 | Loudon | 123/148 E |
| 3,072,823 | 1/1963 | Kirk | 315/205 |

*Primary Examiner*—John F. Campbell
*Assistant Examiner*—Donald P. Rooney
*Attorney*—Barnes, Kisselle, Raisch and Choate

[57] ABSTRACT

A single-cylinder internal-combustion engine is provided with an ignition system of the capacitor discharge-type having a magneto for its source of electrical energy. The magneto comprises a rotor which carries a permanent magnet and is driven by the crankshaft of the engine. A main charging coil, a first trigger coil and a second trigger coil are mounted on the stator of the magneto. The position of the first coil on the stator is correlated to the engine cycle to provide an advanced ignition timing pulse and the position of the second trigger coil on the stator is correlated to the engine cycle to provide a retarded ignition timing pulse. During each revolution of the rotor a capacitor in the ignition circuit is charged from the main coil and then discharged through an ignition transformer by a silicon-controlled rectifier. Discharge of the capacitor through the rectifier is selectively timed by either the advanced ignition timing pulse of the retarded ignition timing pulse depending on the speed of the engine. The second coil is connected directly across the gate-cathode of the rectifier and the first coil is connected in series with a resistor across the second coil. The first and second coils are substantially identical within manufacturing tolerances and they are mounted on the stator with substantially identical airgaps. The value of the resistor connected in series with the first coil is such that during relatively low-cranking speeds during starting the gate voltage applied from the first coil is substantially below the critical gate voltage required to fire the rectifier. At cranking and at running speeds the retarded ignition timing pulse from the second trigger coil exceeds the critical voltage. Hence at low-cranking speeds during starting the retarded ignition timing pulse generated at the second coil fires the rectifier to initiate discharge of the capacitor at or about top dead center in a compression stroke. After the engine starts, the increased velocity of the rotor at running speeds causes the amplitude of the advanced ignition timing pulse generated in the first coil to exceed the critical gate voltage to initiate discharge of the capacitor and advance the spark.

7 Claims, 3 Drawing Figures

PATENTED MAR 7 1972

3,646,667

INVENTOR
DOUGLAS G. JANISCH

BY
Barnes, Kisselle, Raisch & Choate

ATTORNEYS

IGNITION CIRCUIT

This application is a division of my copending application Ser. No. 684,051, filed Nov. 17, 1967, and entitled "Ignition Circuit," now U.S. Pat. No. 3,524,438, granted Aug. 18, 1970.

In a copending United States patent application entitled "Ignition Circuit with Automatic Spark Advance," Ser. No. 684,052, filed Nov. 17, 1967, abandoned in favor of continuation Ser. No. 882,355, filed Dec. 15, 1969, and assigned to the assignee of the present application, James B. Farr, inventor, there is disclosed a capacitor discharge ignition system wherein the capacitor is discharged through a silicon-controlled rectifier in response to triggering signals correlated rectifier to the engine cycle such that the spark occurs at substantially top dead center at low cranking speeds during starting and the spark is advanced electronically when the engine is running. In one embodiment of the ignition system disclosed in the aforementioned United States patent application of James B. Farr, the advanced ignition timing pulse and the retarded ignition timing pulse are generated, respectively, by separate trigger coils mounted on the stator of a magneto. The coils are positioned in spaced relationship with the position of the coils being correlated to the engine cycle to produce the advanced and the retarded timing signals at the proper time in the engine cycle. The advanced ignition timing pulse is rendered ineffective at low cranking speeds during starting by using coils having different parameters, as for example, a different number of turns in the coils, or different airgaps for the coils. These dual coil ignition systems operate effectively and provide very easy starting as compared to prior art ignitions having fixed timing or having mechanical timing advance. The ignition systems can be mass produced at a low cost. However, it is highly desirable to further reduce manufacturing costs and improve the reliability of such ignition systems, particularly in the small engine field.

Thus the objects of the present invention are to provide an ignition system having automatic ignition timing advance that provides an effective timing shift from engine timing desired when the engine is cranked at low speeds during starting to an engine timing desired at operating speeds; that provides effective easy starting; that is more reliable and can be mass produced more economically compared to ignition systems having automatic ignition advance of the aforementioned type; and that is particularly suited to single-cylinder engines having a magneto and a capacitor discharge-type ignition system.

Other objects, features and advantages of the present invention will be apparent in connection with the following description, the appended claims and the accompanying drawings in which:

Figure 2:
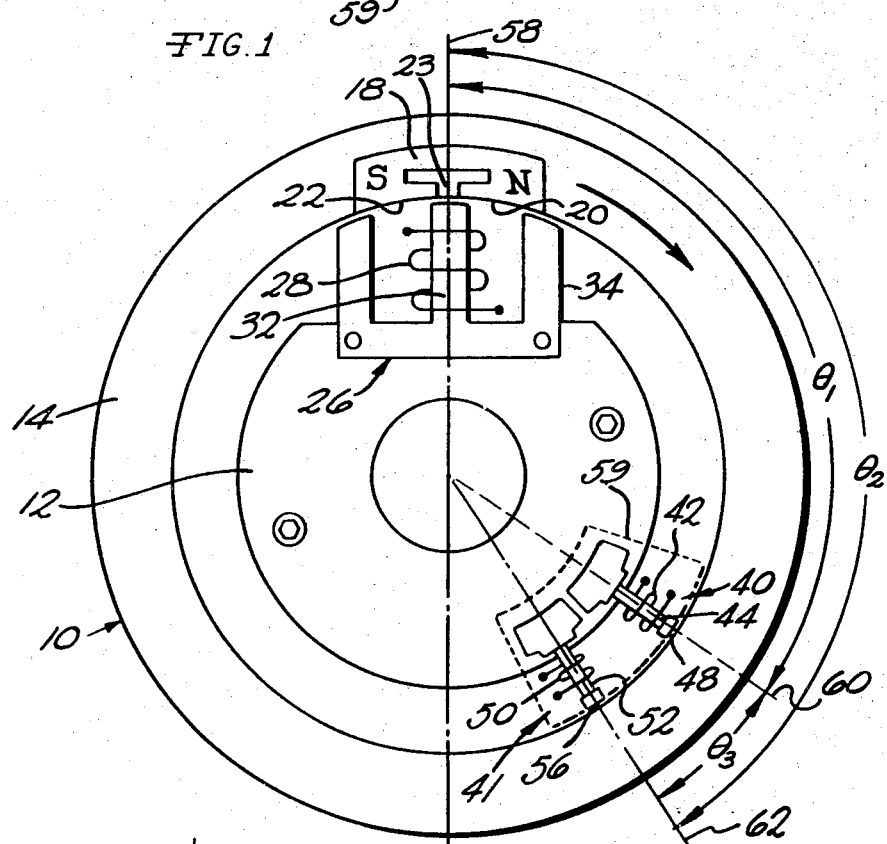
FIG. 2 is a view diagrammatically illustrating a magneto in the ignition circuit of FIG. 1.

Referring more particularly to the drawings, there is illustrated a magneto designated generally at 10 and comprising a stator 12 and a rotor 14 which is drivingly connected to the crankshaft (not shown) of a single-cylinder engine to rotate in a clockwise direction as viewed in FIG. 2 in synchronism with the engine. A permanent magnet 18 embedded in rotor 14 has a north magnetic pole face 20 and a south magnetic pole face 22 that extend circumferentially along the inner periphery of rotor 14 with a narrow gap 23 therebetween. The stator 12 is fastened on the engine by suitable means and is stationary relative to rotor 14. Mounted on the stator 12 is a main charging coil assembly 26 which includes a charging coil 28 wound on the center leg 32 of an E-shaped core 34. This arrangement provides a rapid flux reversal in the center leg 32 causing a relatively high voltage to be generated in coil 28. Two trigger coil assemblies 40, 41 are also mounted on stator 12 in spaced relation to each other and to the main coil assembly 26.

The trigger coil assembly 40 generally comprises a coil 42 wound on a core 44. Core 44 projects radially outwardly from stator 12 with the radially outer end of core 44 spaced from the rotor 14 to form an airgap 48 with rotor 14 and magnet 18. Similarly, the trigger coil assembly 41 generally comprises a trigger coil 50 wound on a core 52 which projects radially outwardly from stator 12. The radially outer end of the core 52 defines an airgap 56 with the magnet 18. In the preferred embodiment, the coil assemblies are potted in a housing 59 along with other circuit components as will be later described, and the potted housing is fastened on or formed integrally with the stator 12. The angular displacement between the axis 58 of the charging coil 28 and the axis 60 of the trigger coil 42 is designated $\theta_1$ whereas the corresponding angular displacement in the axis 62 of the coil 50 is designated $\theta_2$ and the angular displacement between the axes 60, 62 is designated $\theta_3$. $\theta_1$ and $\theta_2$ may also be considered as representing crankshaft angles and time. In general, the location, $\theta_1$, of the trigger coil 42 is correlated to the engine cycle to provide an advanced ignition timing when the engine is running and the location, $\theta_2$, of the trigger coil 50 is correlated to the engine cycle to provide retarded ignition timing when the engine is cranked at low speeds during starting.

Figure 1:
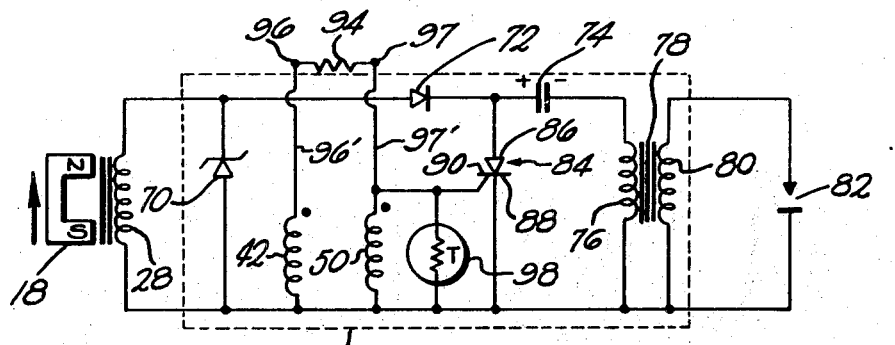
FIG. 1 is a circuit diagram of solid-state, capacitor discharge ignition having an improved dual-coil triggering circuit.

Referring more particularly to the circuit in FIG. 1, a Zener diode 70 is connected directly across the charging coil 28 to clamp the maximum positive voltage generated in coil 28 when the upper terminal of coil 28, as viewed in FIG. 1, is positive. Also connected across the charging coil 28 is a series circuit comprising a silicon diode 72, a capacitor 74 and a primary winding 76 of an ignition transformer 78. The secondary winding 80 of transformer 78 is connected directly across the spark plug 82. Connected directly across the series-connected capacitor 74 and winding 76 is a silicon-controlled rectifier 84 having an anode 86, a cathode 88 and a gate electrode 90. The trigger coil 50 is connected directly across the gate and cathode of the rectifier 84. The other trigger coil 42 is connected in series with a resistor 94 with the serially connected coil 42 and resistor 94 being in parallel with coil 50 across the gate 90 and cathode 88 of rectifier 84. Coils 42, 50 are connected in the gate circuit of rectifier 84 to have the same relative polarity as indicated by the dots in FIG. 1. In the preferred embodiment, that portion of the circuit of FIG. 1 enclosed by dashed lines 95 is potted in housing 59 and the connection of resistor 94 in the circuit of FIG. 1 is via terminals 96, 97 located on the outside of housing 59. Coils 42, 50 are connected to terminals 96, 97 via suitable leads 96', 97'.

In the preferred embodiment of the present invention, the coil assemblies 40, 41, particularly coils 42, 50, are identical within manufacturing tolerances and hence the trigger coil assemblies have substantially identical parameters and characteristics. The trigger coil assemblies 40, 41 are mounted on the stator 12 so as to have substantially identical airgaps 48, 56, respectively, with magnet 18. As will later be described in greater detail in connection with FIG. 3, the value of the resistor 94 is selected so that at cranking speeds during starting the advanced ignition timing pulse generated in coil 42 is substantially below the gate voltage required to fire rectifier 84 and hence is ineffective whereas at running speeds the voltage generated in coil 42 will fire rectifier 84. The retarded ignition timing pulse generated in the coil 50 has an amplitude at cranking speeds during starting and at running speeds that is sufficient to fire the rectifier 84. However, at running speeds, the pulse from coil 50 has no effect since capacitor 74 will have been discharged in response to the pulse from coil 42.

Also connected across gate 90 and cathode 88 of rectifier 84 is a thermistor 98 having a negative temperature coefficient so that its resistance decreases with increasing temperature. The thermistor 98 provides compensation for variations in the critical gate-cathode voltage of rectifier 84 with increasing temperatures and minimizes spurious triggering due to stray flux at high engine speeds. Thermistor 98 is selected based on the voltage generated in the coil 42 at running speeds, the value of resistor 94 and the temperature characteristics of the gate-cathode of the rectifier 84 so that with increased temperature the gate voltage developed across thermistor 98 decreases corresponding to decreases with increasing temperature in the critical gate voltage of rectifier 84.

Figure 3:
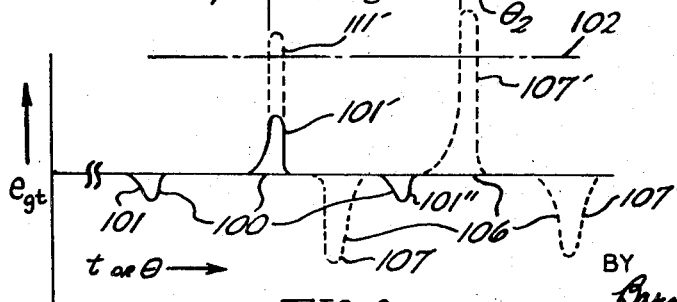
FIG. 3 is a diagram illustrating the waveforms of timing voltages generated in the trigger coils of FIGS. 1 and 2.

The operation of the ignition system described hereinabove can best be understood in connection with the waveforms illustrated in FIG. 3 wherein crankshaft angles are plotted along the abscissa axis and gate voltage magnitudes are plotted along the ordinate axis. The abscissa axis can also be considered as representing time at different scales for different engine speeds. It will be understood that the waveforms illustrated in FIG. 3 are for purposes of explanation and are not necessarily intended to be to scale. When the engine is turned at a relatively low cranking speed during starting, as magnet 18 sweeps past the charging coil 28, the alternating voltage generated in coil 28 is rectified by diode 72 to charge capacitor 74 to the polarity indicated in FIG. 1. As magnet 18 continues to rotate in a clockwise direction as viewed in FIG. 2, the magnet sweeps past the advanced ignition timing coil 42 and generates an alternating signal therein which, due to the voltage drop across resistor 94, has a waveform 100, shown in full lines, (FIG. 3) when applied to gate 90. The signal 100 comprises three pulses 101, 101' and 101" of alternating polarity. Coil 52 is connected to gate 90 so that the first pulse 101 is negative, the second pulse 101' is positive and the third pulse 101" is negative. In the preferred embodiment being described, only the positive pulse 101' is utilized. Pulse 101' is generated when gap 23 passes core 44. The critical gate voltage required to fire rectifier 84 is designated by the voltage level 102. At cranking speed the peak amplitude of the pulse 101' is substantially below the critical gate voltage level 102 and hence is ineffective to fire the rectifier 84. As magnet 18 continues past the trigger coil 50, an alternating signal 106, shown in dashed lines, is generated in trigger coil 50, and applied to the gate 90 of rectifier 84. The signal 106 also includes a first negative pulse 107, a second positive pulse 107' and a third negative pulse 107". At cranking speed, pulse 107' exceeds the critical level 102 to fire rectifier 84 and initiate discharge of the capacitor 74. The capacitor 74 discharges on half-cycles of one polarity through the rectifier 84 and on opposite polarity half-cycles through the diodes 70, 72 in a damped oscillatory manner. The duration of the pulse 107' is sufficient to allow the capacitor 74 to substantially fully discharge. The crankshaft angle $\theta_2$, (location of the trigger coil 50) is correlated to the engine cycle so that the retarded ignition timing pulse 107' fires rectifier 84 at the desired crankshaft angle to facilitate easy starting, for example, at or near top dead center in the compression stroke.

As soon as the engine starts, the voltage generated in coil 42 will increase substantially. Hence at running speed the first positive pulse 111' in the gate voltage from coil 42, corresponding to pulse 101', exceeds the critical level 102 at the crankshaft angle $\theta_1$. Pulse 111' fires rectifier 84 to initiate discharge of the capacitor 74. The location $\theta_1$ of coil 50 is selected so that the advanced ignition timing pulse 111' occurs at the desired crankshaft angle at running speeds, for example, at an angle of approximately 20° before top dead center. Although the amplitude of the retarded ignition timing pulse corresponding to pulse 107' is also increased substantially at running speeds, the retarded ignition timing signal is ineffective since capacitor 74 is substantially fully discharged in response to the advanced ignition timing pulse 111'. The crankshaft angle $\theta_1$ is selected for optimum performance at normal running speeds and will be a compromise between optimum timing for maximum speeds and for idle speeds. This is not a serious disadvantage for most uses of single-cylinder engines where the timing shift is desired primarily to facilitate easy starting. Additionally, such engines are run over a relatively narrow speed range for many applications.

Ignition circuits described hereinabove can be mass produced at low manufacturing cost and will provide reliable and uniform operation as between individual circuits. Since the coils 42, 50 are of the same type and the coil assemblies 40, 41 have substantially identical characteristics, substantial manufacturing costs reductions are achieved. Utilizing only one type of coil minimizes purchasing costs and inventory problems. In production, the ignition circuit is completely assembled, except for the connection of resistor 94 to the terminals 96, 97 and then potted or encapsulated in housing 59 and mounted on stator 12. The use of a single type of coil for both of the coils 42, 50 facilitates assembly of the two coils in the circuit.

With the magneto assembled except for the connection of resistor 94, the magneto is driven on a test stand while an assembly line worker selects a particular resistor for connection to terminals 96, 97. The value of a particular resistor 94 is chosen to obtain the required amplitude relationship for pulses 101', 111' at cranking speed and at running speed, respectively, and to obtain the required amplitude relationship between pulse 101' and pulse 107' cranking speed. A ratio of less than one to five between the peak amplitude of pulses 101' and 107' provides sufficient amplitude separation and is preferred. Assembly line selection of a particular resistor for connection to terminals 96, 97 can be accomplished effectively using six to 10 standard resistors having graduated values. The standard resistors are incorporated in suitable semiautomated test equipment for temporary insertion into the circuit while the triggering signals are monitored on an oscilloscope. After the best value for resistor 94 is selected, a resistor having that value is soldered to terminals 96, 97. Thus, in effect, each ignition circuit is matched to the magneto as the last step in production. This permits a final adjusting step to compensate for variations in the different circuit components and for variations in the assembly of the components, as for example, variations in the airgaps 48, 56, resulting in uniformity between circuits and hence interchangeability.

Although in the preferred embodiment pulses 107' and 111' are utilized, it will be apparent that other pulse pairs can also be used. For example, by reversing the coil leads the first pulses corresponding to pulses 101 and 107 will be positive and will have the desired time separation. However, pulses 107' and 111' are preferred since higher amplitudes are generated at cranking speed using smaller coils.

By way of example, on engines in the 2.5–7 horsepower range, a typical cranking speed is in the range of 300–400 r.p.m. with minimum cranking speeds of 100–150 r.p.m. and a typical idle speed is above 1,500 r.p.m. The circuit is designed to provide a timing shift in a speed range of 800–1,000 r.p.m. Ignition timing is at approximately top dead center at cranking speed with a 20° advance before top dead center at speeds above 800–1,000 r.p.m. This timing advance provides very easy starting and acceptable engine performance.

It will be understood that the ignition system having automatic timing advance and the method of producing such a circuit have been described hereinabove for purposes of illustration and are not intended to indicate limits of the present invention, the scope of which is defined in the following claims.

I claim:

1. In a production line method of assembling ignition systems adapted to ignite a combustible charge in an internal combustion engine wherein each ignition system comprises an electron control device having an output terminal, an input terminal and a common terminal, said electron control device being responsive to a triggering signal having a predetermined amplitude value applied between said input terminal and said common terminal to switch said control device to a first state of conduction through said output terminal and said common terminal, said first state of conduction of said electron control device being adapted to initiate ignition of said charge, and ignition timing circuit means comprising at least a first trigger coil and means movable relative to said coil and in synchronism with said engine and operable to develop a first signal in said first coil, said first trigger coil being disposed relative to said relatively movable means so that said first signal occurs at substantially a first predetermined time correlated to a first time in a timing cycle of said engine at a predetermined engine speed, assembling each ignition circuit by the steps of causing relative motion between said first coil and said relatively movable means while selectively and temporarily inserting in circuit with said first coil individual resistance means having different resistance values, measuring the amplitude of said first signal during relative motion between said first coil and said relatively movable means while respective ones of said resistance means are in circuit with said first coil, comparing the measured amplitudes of said first signal with said predetermined value, and then connecting in circuit with said first coil, said input terminal and said common terminal that one of said resistance means having a resistance value such that said triggering signal has an amplitude at least equal to said predetermined value and at said predetermined speed.

2. The method set forth in claim 1 wherein each ignition circuit is encapsulated in potting material prior to connecting said resistance means in circuit with said first coil.

3. The method set forth in claim 1 wherein said ignition further comprises a second trigger coil operatively disposed relative to said relatively movable means to develop a second signal in said second coil that occurs at substantially a second predetermined time in said timing cycle of said engine at a second predetermined speed when said engine is cranked during starting, and wherein said second coil is connected to said input terminal and said common terminal prior to said measuring of the amplitude of said first signal, prior to comparing said measured amplitude of said first signal with said predetermined value, and prior to connecting said resistance means in circuit with said first coil.

4. The method set forth in claim 1 wherein said step of connecting said resistance means in circuit with said first coil is substantially the last step in assembling said ignition circuit.

5. In the method of assembling an ignition system adapted to ignite a combustible charge in an internal combustion engine and wherein said ignition system comprises an electron control device having a pair of output terminals and a pair of input terminals and being responsive to an electrical signal having a predetermined amplitude value applied to said input terminals to switch said control device to a first state of conduction, said first state of conduction of said electron control device being adapted to initiate ignition of said charge, and ignition timing circuit means comprising a first trigger coil, a second trigger coil and means movable relative to said coils and in synchronism with said engine and operable to develop a first triggering signal in said first coil and a second triggering signal in said second coil, said first and second trigger coils being disposed relative to each other and to said relatively movable means so that said first signal is correlated to a first time in a timing cycle of said engine when said engine is operating at a running speed and so that said second signal is correlated to a second time in said engine cycle when said engine is cranked at a lower speed during starting, the steps of operatively connecting said second coil to said input terminals of said electron control device, causing relative motion between said coils and said relatively movable means at speeds representing said running speed and said cranking speed, measuring the amplitude of at least one of said first and said second triggering signals during relative motion between said coils and said relatively movable means and then connecting in circuit with said first coil an impedance having a value such that at said lower cranking speed said first triggering signal has an amplitude below said predetermined value and said second triggering signal has an amplitude exceeding said predetermined value and so that at said running speed said first triggering signal exceeds said predetermined value.

6. In the method of assembling an ignition system adapted to ignite a combustible charge in an internal combustion engine and wherein said ignition system comprises an electron control device having a pair of output terminals and a pair of input terminals and being responsive to an electrical signal having a predetermined amplitude value applied to said input terminals to switch said control device to a first state of conduction, said first state of conduction of said electron control device being adapted to initiate ignition of said charge, and ignition timing circuit means comprising a first trigger coil, a second trigger coil and means movable relative to said coils and in synchronism with said engine and operable to develop a first triggering signal in said first coil and a second triggering signal in said second coil, said first and second trigger coils being disposed relative to each other and to said relatively movable means so that said first signal is correlated to a first time in a timing cycle of said engine when said engine is operating at a running speed and so that said second signal is correlated to a second time in said engine cycle when said engine is cranked at a lower speed during starting, the steps of causing relative motion between said first coil and said relatively movable means while selectively and temporarily inserting in circuit with said first coil individual resistance means having different resistance values, measuring the amplitude of said first triggering signal during relative motion between said first coil and said relatively movable means while respective ones of said resistance means are in circuit with said first coil, comparing the measured amplitudes of said first signal with said predetermined value, and then connecting in circuit with said first coil and said input terminals that one of said resistance means having a resistance value such that at said lower cranking speed said first triggering signal has an amplitude below said predetermined value and at said running speed said first triggering signal has an amplitude exceeding said predetermined value.

7. In a production line method of assembling ignition systems adapted to ignite a combustible charge in an internal combustion engine wherein each ignition system comprises an electron control device having an output terminal, an input terminal and a common terminal, said electron control device being responsive to a triggering signal having a predetermined amplitude value applied between said input terminal and said common terminal to switch said control device to a first state of conduction through said output terminal and said common terminal, said first state of conduction of said electron control device being adapted to initiate ignition of said charge, and ignition timing circuit means comprising at least a first trigger coil and means movable relative to said coil and in synchronism with said engine and operable to develop a first signal in said first coil that occurs at substantially a first predetermined time in a timing cycle of said engine at a predetermined engine speed, that improvement comprising connecting a resistance means in circuit with said first coil, said common terminal and said input terminal as substantially the last step in assembly of each ignition system to modify the amplitude of said first signal such that said first signal reaches said predetermined amplitude value at said predetermined time when said engine is operating at said predetermined speed.

* * * * *